United States Patent [19]

Bowman

[11] Patent Number: 4,981,320

[45] Date of Patent: Jan. 1, 1991

[54] PICKUP TRUCK TAILGATE LOCK

[76] Inventor: Clovis G. Bowman, 6306 Norman Rd., Oklahoma City, Okla. 73122

[21] Appl. No.: 496,555

[22] Filed: Mar. 19, 1990

[51] Int. Cl.$^5$ .............................................. B62D 25/00
[52] U.S. Cl. .................................. 296/57.1; 292/263; 403/316; 403/353
[58] Field of Search ............... 296/57.1; 292/269, 263, 292/264; 403/353, 316, 317

[56] References Cited

U.S. PATENT DOCUMENTS

| | | | |
|---|---|---|---|
| 2,204,697 | 6/1940 | Renno et al. | 296/57.1 |
| 2,486,218 | 10/1949 | Snyder | 292/263 |
| 2,561,081 | 7/1951 | Vars | 296/57.1 |
| 2,994,556 | 8/1961 | Sewelin et al. | 296/57.1 |

Primary Examiner—Robert R. Song
Attorney, Agent, or Firm—Robert K. Rhea

[57] ABSTRACT

An antitheft device preventing removal of a pickup truck tailgate from the pickup bed is formed by a pair of metallic members line drilled inwardly of their peripheral edges and disposed on opposing sides of and occluding a portion of the aperture in a pickup tailgate supporting link end portion supported by a stud on the respective pickup bed side wall.

The riveted members overlapping a portion of the stud receiving slot in the tailgate supporting link prevents movement of the link in a direction to be manually removed from the pickup bed tailgate link supporting stud.

5 Claims, 1 Drawing Sheet

PICKUP TRUCK TAILGATE LOCK

BACKGROUND OF THE INVENTION

1. Field of the Invention

This invention relates to pickup trucks and more particularly to a manually applied fastening device preventing unauthorized removal of a tailgate from a pickup truck bed.

Pickup trucks conventionally include a pickup bed having side walls terminating equidistant rearwardly of the truck cab and interconnected transversely of the truck bed by a hingedly mounted tailgate substantially equal in vertical dimension with the side walls forming the pickup bed.

Latch members adjacent the upper limit of the respective end of the tailgate, are releasably connected with the respective side wall of the truck bed so that when released the tailgate may pivot about a horizontal axis, in the plane of the truck bed, toward a rearward and downward direction terminating in a horizontal plane substantially forming a continuation of the horizontal plane of the truck bed.

The tailgate is normally maintained in this lowered horizontal position by a pair of links or cables at its respective ends pivotally connected at one end with the tailgate end upper limit and pivotally connected at their other end with a stud horizontally mounted on the upper portion of the respective upper inner surface of the truck bed side wall.

Most horizontal hinge mountings of a pickup tailgate permit the tailgate to be lifted out of hinge forming sockets at the respective lower limit of the side walls adjacent each end of the tailgate.

The lever linkage or cable end members connecting the tailgate to the bed side walls are removable therefrom when manipulated in a certain fashion so that the tailgate can be separated from the pickup bed. This feature also makes it possible for unauthorized persons to remove a tailgate from a pickup bed.

This invention provides a device by which truck owners, not desiring to remove their tailgate from the pickup bed, to equip their tailgate with antitheft fasteners which normally prevent unauthorized removal of the tailgate from a pickup bed.

2. Description of the Prior Art

Most prior patents of which I am aware disclose hinge mounting features connecting the lower limit of the tailgate to the truck bed side walls near the plane of the truck bed and do not address the problem of arranging the tailgate linkage supporting members against theft of the tailgate.

SUMMARY OF THE INVENTION

A pair of metallic members having one dimension substantially equal with respect to the transverse width of a tailgate support linkage end member are line drilled inwardly of their peripheral edges. The two members are respectively disposed on opposing flat surfaces of a tailgate end support member with the line drilled hole overlying an end portion of the stud receiving slot. The two members are interconnected as by a rivet extending through the aligned holes thereof.

The riveted members thus overlap one end portion of the stud admitting opening and prevent longitudinal movement and a manipulating of the end member of the tailgate support for removal from the respective stud on the pickup bed side wall while permitting pivoting movement of the tailgate support end by member in its usual function when manually opening and closing the tailgate.

The principal object of this invention is to provide a relatively simple, economical, antitheft device for pickup truck tailgate end support members which may be easily and quickly installed by the truck owner and prevents unauthorized removal of the pickup truck tailgate from its pickup bed.

DESCRIPTION OF THE PREFERRED EMBODIMENTS

Figure 1:
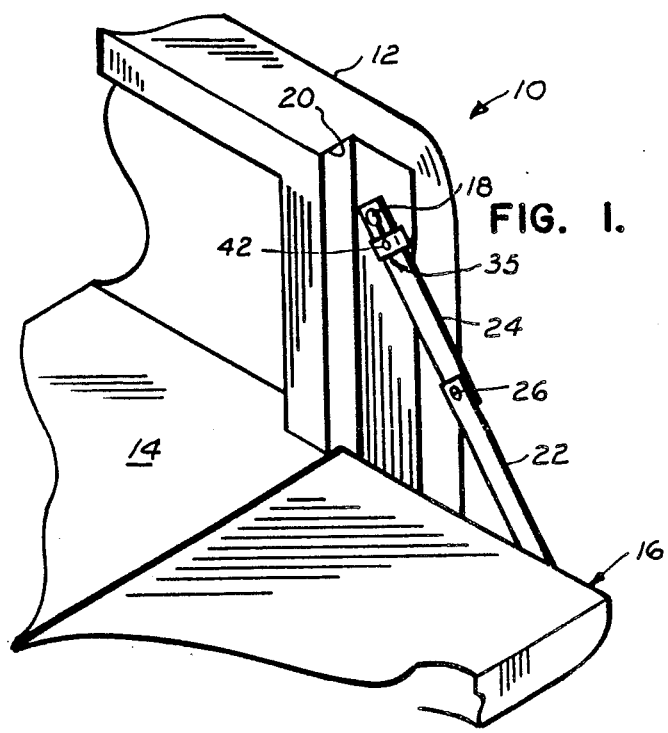
FIG. 1 is a perspective view illustrating a fragment of a lowered pickup truck tailgate supported by a tailgate linkage stud at the rearward end portion upper limit of the pickup bed side wall.

Like characters of reference designate like parts in those figures of the drawings in which they occur.

In the drawings:

The reference numeral 10 indicates a fragment of a pickup truck bed having a side wall 12 at one side of its bed, a pickup bed floor 14 and a fragment of an end gate 16. The upper rearward end portion of the side wall 12 has a round head stud 18 projecting horizontally toward the opposite side wall, not shown, within a substantially right angular recess 20 formed in the rearward inward surface of the pickup bed side wall which nests the adjacent end portion of the tailgate 16 when lifted to a vertical position, closing the rearward end of the pickup truck bed.

The tailgate is normally maintained in its horizontal lowered position by a pair of links 22 and 24. The link 22 is connected at one end, not shown, with the normally upper outer end limit of the tailgate 16 and is pivotally connected by a rivet 26 at its other end portion with one end portion of the link 24. The other end of the link 24 is provided with an opening 28 (FIG. 2) which pivotally surrounds the shank, not shown, of the round head stud 18.

The part-circular end portion of the slot 28 as at 30, is formed on a dimension which freely receives the round head of the stud 18 when the slot 28 of the link end 24 is disposed so that the part-circular recess coincides with the perimeter of the round head stud 18. Thus, the linkage at each side of the pickup truck may be removed from the studs and the bottom edge portion of the tailgate lifted out of its partially cylindrical hinge forming members, not shown.

The above description is substantially conventional with many types of pickup truck beds having removable tailgates and form no part of the invention other than to set forth the combination with which the present invention is intended to be used.

Figure 6:
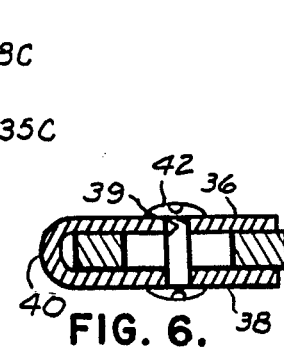
FIG. 6 is a horizontal sectional view taken substantially along the line 6—6 of FIG. 4.
Figure 7:
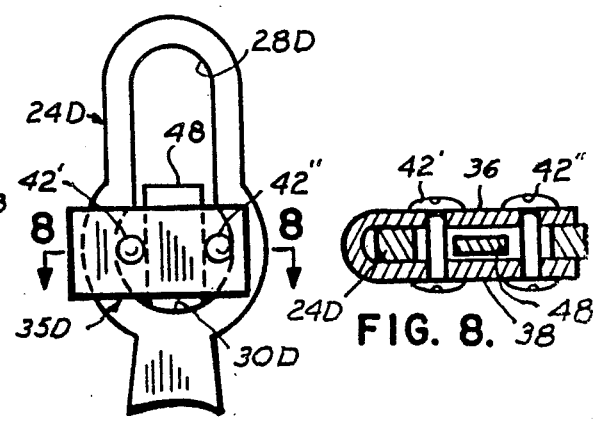
FIG. 7 is a view similar to FIG. 5 illustrating an alternative embodiment of a pickup tailgate support end member having a flexible tongue disposed within its stud receiving slot and a pair of rivets joining the antitheft members; and, FIG. 8 is a horizontal sectional view taken substantially along the line 8—8 of FIG. 7.
Figure 8:
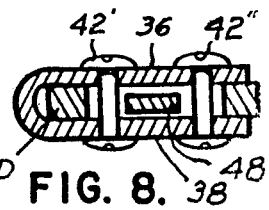

The device indicated generally at 35 comprises a length of strap metal doubled back upon itself to form an elongated U-shape, as best shown in FIGS. 6 and 8, having leg portions 36 and 38 projecting equidistant from its bight portion 40.

The longitudinal length of the leg members 36 and 38 are substantially equal to the transverse dimension of the pickup truck bed link 24. The spacing between the legs 36 and 38 is such that it is slidably received by opposing flat surfaces of the link 24 when the bight portion 40 is disposed at one longitudinal side edge of the link.

Figure 2:
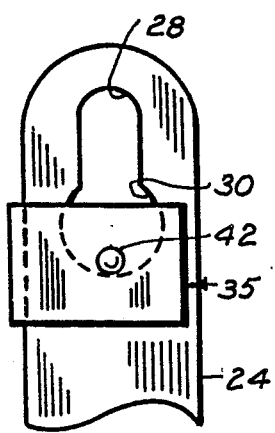
FIG. 2 is a fragmentary elevational view to a larger scale, illustrating a conventional key hole-like slot in the end of a pickup truck tailgate support link having the device installed thereon.
Figure 3:
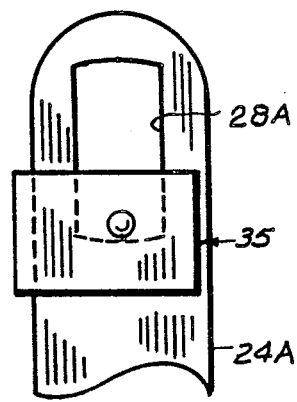
FIG. 3 is a view similar to FIG. 2 illustrating the antitheft device mounted on an end portion of a tailgate supporting link having a rectangular slot therein.
Figure 4:
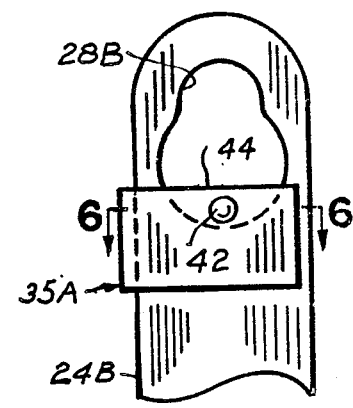
FIGS. 4 and 5 are similar views illustrating respectively different configurations of the slot in a tailgate linkage support member and respectively different placement of the rivet.

The link legs 36 and 38 are separately or centrally line drilled, as at 39 (FIG. 6), within the boundaries of the respective leg, as illustrated by FIGS. 2 and 3. The line drilled aperture 39 is substantially medially the opposing flat surfaces of each of the legs. The apertures 39 receives a fastening means, such as a rivet extending through both legs 36 and 38 when positioned on the link 24 and extends through a portion of the part-circular opening 30.

The tailgate linkage supporting stud in some pickup trucks is characterized by a rectangular head substantially equal in overall dimensions with the opening 28A in the linkage 24A and generally referred to as a T-shaped stud.

A stud's rectangular head portion easily passes through the opening 28A and in this embodiment the device 35 is similarly installed at one end portion of the opening 28A and prevents removal of the link 24A from its supporting stud, yet permits vertical pivoting movement of the link 24A about the shank of a T-shaped stud.

Figure 5:
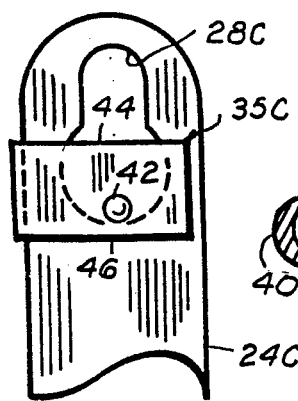

Some pickup trucks tailgate stud supported linkage end members are formed in a different configuration than shown by FIGS. 2 and 3, as shown by the linkage openings 28B in the link 24B in which the device 35A is provided with its rivet adjacent one edge 44 of the device 35A. As illustrated by FIG. 5, a linkage 24C opening 28C is slightly shortened when compared with the longitudinal length of the opening 28 of FIG. 2 so that the device 35C has the rivet 42 disposed adjacent the edge 46 opposite the edge 44 of the locking device 35C.

FIG. 8 shows a further modification of the pickup tailgate supporting member in which its key hole-like slot has the slot portion further elongated as at 28D, opposite its partcircular portion 30D. A longitudinally extending flexible tongue 48 is secured at one end to the surface forming the end limit of the part-circular slot, opposite the end 28D. In this embodiment, the anti-lock device 35D is provided with a pair of rivets disposed in transversely spaced apart relation with respect to the link member 24D so that the rivets 42' and 42" are disposed on opposing sides of the flexible tongue 48, and thus prevents lateral movement of the link 24D in a separating direction with respect to its supporting stud, not shown.

Obviously the invention is susceptible to changes or alterations without defeating its practicability. Therefore, I do not wish to be confined to the preferred embodiment shown in the drawings and described herein.

I claim:

1. A pickup truck bed defined by opposing side walls and having a normally removable tailgate vertically pivotable between vertical and horizontal positions and normally supported when horizontal by elongated tailgate support members pivotally connected at one end with a tailgate end surface and having a slot in its other end portion removably receiving in tailgate supporting relation a stud horizontally connected with the respective pickup bed side wall rearward end portion upper limit, the improvement comprising:

cooperating rigid planar members flatly overlying opposing surfaces and one end portion of the slot in an end member of a tailgate support; and, fastener means extending through and rigidly joining said planar members together for permanently occluding a portion of the slot and maintaining the stud within the slot.

2. A pickup truck bed defined by opposing side walls and having a normally removable tailgate vertically pivotable between vertical and horizontal positions and normally supported when horizontal by elongated tailgate support members pivotally connected at one end with a tailgate end surface and having a slot in its other end portion removably receiving in tailgate supporting relation a stud horizontally connected with the respective pickup bed side wall rearward end portion upper limit, the improvement comprising:

a U-shaped strap metal member having parallel legs transversely overlying opposing surfaces and an end portion of the slot in a tailgate end support member; and, fastener means extending through and rigidly joining said legs together for permanently occluding a portion of the slot and maintaining the stud within the slot.

3. A pickup truck bed defined by opposing side walls and having a normally removable tailgate vertically pivotable between vertical and horizontal positions and normally supported when horizontal by elongated tailgate support members pivotally connected at one end with a tailgate end surface and having a slot in its other end portion removably receiving in tailgate supporting relation a stud horizontally connected with the respective pickup bed side wall rearward end portion upper limit, the improvement comprising:

a U-shaped strap metal member having parallel legs transversely overlying opposing surfaces and an end portion of the slot in a tailgate end support member; and, fastener means including a rivet centrally extending through and rigidly joining said legs together for permanently occluding a portion of the slot and maintaining the stud within the slot.

4. The combination according to claim 3 in which the rivet is disposed adjacent one edge and medially the length of the legs.

5. The combination according to claim 4 in which the fastener means comprises a pair of rivets disposed in spaced-apart relation longitudinally of said legs.

* * * * *